United States Patent [19]
Sato et al.

[11] Patent Number: 4,832,888
[45] Date of Patent: May 23, 1989

[54] METHOD FOR PRODUCING HIGH-DENSITY SILICON NITRIDE SINTERED PRODUCT

[75] Inventors: Nobuhiro Sato; Haruyuki Ueno; Yuji Katsura; Takashi Hamamatu, all of Kitakyushu, Japan

[73] Assignee: Kurosaki Refractories Co., Ltd., Fukuoka, Japan

[21] Appl. No.: 87,474

[22] Filed: Aug. 20, 1987

Related U.S. Application Data

[63] Continuation-in-part of Ser. No. 762,609, Aug. 5, 1985, abandoned, and a continuation-in-part of Ser. No. 942,243, Dec. 16, 1986, abandoned, which is a continuation-in-part of Ser. No. 705,686, Feb. 26, 1985, abandoned.

[30] Foreign Application Priority Data

Mar. 3, 1984 [JP] Japan ................................. 59-40725
Aug. 7, 1984 [JP] Japan ............................... 59-166139

[51] Int. Cl.$^4$ ............................................. C04B 35/58
[52] U.S. Cl. ...................................... 264/63; 423/344; 501/92
[58] Field of Search ......................... 264/63; 423/344; 501/92

[56] References Cited

U.S. PATENT DOCUMENTS

| | | | |
|---|---|---|---|
| 3,222,438 | 12/1965 | Parr et al. | 264/66 |
| 3,778,231 | 12/1973 | Taylor | 423/344 |
| 3,819,786 | 6/1974 | May | 264/63 |
| 4,164,528 | 8/1979 | Yajima et al. | 264/63 |

FOREIGN PATENT DOCUMENTS

| | | | |
|---|---|---|---|
| 717555 | 10/1954 | United Kingdom | 423/344 |
| 1335842 | 10/1973 | United Kingdom | 423/344 |

Primary Examiner—James Derrington
Attorney, Agent, or Firm—Jordan and Hamburg

[57] ABSTRACT

A shaped body of silicon nitride enjoying high density, ample shrinkage, and outstanding mechanical strength is produced in a desired pattern by a method of preparing a shaped body comprising Si particles and a compound capable of remaining as SiC or C in the form of film on the surface of the Si particles in a non-oxidative atmosphere at a temperature in the range of 900° to 1,400° C., subjecting the shaped body to sintering and shrinkage of not less than 1% in an atmosphere of inert gas at a temperature exceeding 900° C., and not exceeding the softening point of Si, and subsequently subjecting the resultant sintered shaped body to nitriding in a nitriding atmosphere at a pressure exceeding atmospheric pressure and at a temperature in the range of 1,200° to 1,500° C. In another aspect of the present invention, a method for producing a silicon nitride sintered product entails preparing a molded body by adding, to powdery silicon grains, a compound that decomposes under heating to produce $H_2$ or hydrocarbon compounds such as $CH_4$ and $C_2H_6$ in a temperature range from 500° C. to 1200° C., subjecting the molded body to a heat treatment in a gas atmosphere of a nitriding gas and/or an inert gas, and then chemically converting silicon into silicon nitride in a nitriding gas at a temperature higher than 1200° C.

10 Claims, No Drawings

METHOD FOR PRODUCING HIGH-DENSITY SILICON NITRIDE SINTERED PRODUCT

This application is a Continuation-in-Part application of U.S. Ser. No. 762,609, filed Aug. 5, 1985, now abandoned, and U.S. Ser. No. 942,243, filed Dec. 16, 1986, now abandoned, which is a Continuation-in-Part of Appln. Ser. No. 705,686, filed Feb. 26, 1985, now abandoned.

BACKGROUND OF THE INVENTION

The present invention relates to a method for the production of silicon nitride ceramics of high density by the reaction sintering method and to the production of silicon nitride-type fine ceramics.

Silicon nitride, similarly to silicon carbide, excels in mechanical strength, resistance to thermal shock, resistance to wear, and chemical stability at elevated temperatures and, therefore, finds extensive utility as a high-temperature structural material.

Production processes for silicon nitride sintered products can be classified into the reaction sintering method and the atmospheric sintering method.

The reaction sintering method effects production by subjecting a shaped body of Si powder to a nitriding reaction in a nitriding atmosphere.

This method has the following merits:

(1) The shaped body can be molded by any of various methods;

(2) Since dimensional contraction after the nitriding reaction is extremely small, products of a large and complicated shape can be obtained relatively easily with high dimensional accuracy;

(3) Since the nitriding reaction generally does not require the use of any sintering additives, the shaped body consequently produced retains strength and other properties intact even at elevated temperatures;

(4) Sintered products of larger size can be produced more easily as compared with the atmospheric sintering method; and (5) Sintered products obtained by this method show no reduction in strength even under a high temperature.

In spite of the merits described above, the sintered body obtained by the conventional reaction sintering method acquires high density and strength with difficulty as compared with a sintered body obtained by the atmospheric sintering method or the hot press method. It is, therefore, deficient in mechanical properties such as strength and resistance to wear and finds fairly limited utility as a high-temperature structural material. If the reaction sintering method could be improved to fabricate products of suitable high density, the shaped body obtained thereby would also acquire improved mechanical properties, manifest the aforementioned features to the fullest extent, and prove useful as a high-temperature structural material.

The major reason that high density products cannot be obtained by the reaction sintering is that sintering shrinkage scarcely occurs when the structure of the molded material transforms into sintered silicon nitride.

As one means of increasing the density of a reaction sintered body of silicon nitride, there can be cited a method of adjusting the size of Si particles, heightening the molding pressure thereby increasing the density of the resultant-shaped body of Si particles, and subjecting the shaped body to a nitriding reaction.

This method is not completely satisfactory, because the density finally attained has its limit.

Another method developed similarly for the purpose of increasing density involves sintering Si in an atmosphere of inert gas such as Ar gas prior to subjecting the shaped body to a nitriding reaction. This method, however, does not bring about an effective sintering shrinkage. This is because the migration of Si is preponderantly caused by vaporization and surface diffusion and sintering shrinkage is obstructed by voluminal expansion. It has been reported that boron or a compound thereof possesses an ability to repress the vaporization and surface diffusion of Si which is detrimental to the sintering shrinkage of Si and, therefore, serves efficiently in the increase of density. Addition of boron, however, results in degradation of the resistance to oxidation.

A two-stage sintering method has been proposed as a process to improve the above-mentioned defects in reaction sintering. This two-stage sintering method includes preparing a porous silicon nitride sintered product by reaction sintering, impregnating the pores of the sintered product with a compound of Al, Mg, Y, or the like as a sintering promoting agent of silicon nitride, and then sintering the same again to cause sintering shrinkage to finally densify the structure of the product. However, this two-state sintering method has a defect in that the sintered product thus obtained shows the same significant reduction in product strength as in the atmospheric sintering method at a high temperature range above 1000° C. Therefore, this defect eliminats the merit of the reaction sintering itself.

Further, as another method for improving the density and strength of a sintered product, there has been proposed a method of using powdery metallic silicon grains as the starting material and densifying the product through shrinkage during sintering of the grains. However, this method has not yet actually been successful, because a film of silicon oxide (silica) formed on the surface of the powdery silicon grains causes obstruction of the sintering between silicon grains. Although the use of $H_2$ gas may be considered for removing the silica film, the reaction between $H_2$ gas and the silica film takes place only at a high temperature above 1200° C., where the sintering between silicon grains proceeds rapidly, to cause such a significant sintering shrinkage as to eliminate the open pores necessary for the subsequent nitriding reaction in the molded product. Thus, since the nitriding reaction itself is inhibited, this method cannot be utilized.

Therefore, since the optimum temperature for controlling sintering between silicon powder is about 1100° C., it is necessary that the silica film on the surface of the powdery metallic silicon grains be eliminated before the temperature is increased to that level.

SUMMARY OF THE INVENTION

An object of this invention is to overcome the foregoing problems and provide a reaction sintering method for obtaining a silicon nitride sintered product having high srength even under high temperature, with improved strength and density of the structure.

Another object of this invention is to eliminate the aforementioned drawbacks suffered by the conventional reaction sintering method and permit production of a high-density sintered body of silicon nitride.

Other objects and characteristic features of the present invention will become apparent to those skilled in the art as the disclosure is made in the following description of preferred embodiments of the invention.

DETAILED DESCRIPTION OF THE PREFERRED EMBODIMENTS

As a means of decreasing vaporization and surface diffusion of Si, both of which are detrimental to the sintering shrinkage of Si in an atmosphere of inert gas, the present invention uses a shaped body comprising Si particles and a compound remaining as SiC or C in the form of a film on the surface of the Si particles in a non-oxidative atmosphere at a temperature in the range of 900° to 1,400° C.

The aforementioned compound is desired to be of a nature such that the major portion thereof persists as SiC or C. This is because the compound, if the major portion thereof is liable to evaporate, has only a small amount of residual SiC or C effectively covering the surface of Si particles and the departure of the major evaporating portion leaves behind pores on the surface. When this compound is of a type which is in a resinous state at room temperature, it readily coats the surface of Si particles during the mixture thereof with the Si particles. The coat of this resinous compound so formed is allowed, when the resultant mixture is heated in a non-oxidative atmosphere, to remain as SiC or C in the form of a film on the surface of the Si particles. Subsequently, during the sintering of Si, the persisting coating represses vaporization and surface diffusion of Si which are detrimental to the sintering shrinkage of Si and promotes the sintering shrinkage of Si in consequence of voluminal diffusion.

Examples of the resinous compound usable advantageously herein include organic high molecular silicon compounds such as polycarbosilane and polysiloxane, which are destined to survive as SiC, and phenol resin, furan resin, epoxy resin, xylene resin, tar, and pitch, which are destined to survive as C. One compound or a mixture of two or more compounds selected from among the compounds enumerated above can be used.

When the resinous compound is of the type destined to survive as C, the greater part of the compound reacts with Si and forms SiC. Generally, it does not entail any degradation of chemical stability or resistance to oxidation.

The amount of the resinous compound to be added is determined by the proportion of the compound allowed to remain as SiC or C. It is desired to add this compound in such an amount that 1 to 10% by weight of this compound will eventually survive as SiC or C. If the added amount is too small, naturally the sintering shrinkage of Si due to the aforementioned mechanism fails to proceed as expected. If it is too large, the added compound possibly interferes with the sintering shrinkage and the subsequent nitriding of Si and causes degradation of mechanical and chemical properties.

The sintering shrinkage of Si is required to be effected by making the most of the aforementioned mechanism to a point where the nitriding reaction will not be obstructed by otherwise possible clogging of the paths for infiltration of nitrogen during the course of the nitriding.

This sintering shrinkage of Si is caused to proceed in an atmosphere of inert gas such as argon at a temperature exceeding 900° C. and not exceeding the softening point of Si, preferably at a temperature falling in the range of 1,100° to 1,200° C. The degree of the sintering shrinkage is controlled by temperature and duration of the treatment. Although the treatment may be carried out in a completely evacuated enclosure, it is carried out more desirably in the aforementioned atmosphere of inert gas in due consideration of the vaporization of Si.

The salient advantages of the thorough sintering shrinkage of the interstices between Si particles prior to the nitriding reaction include the improvement of mechanical properties due to increase of density and the enhancement of reliability. In other words, the faults which are already enveloped during the preparation of a shaped article of Si particles and which are liable to persist after completion of the nitriding reaction are decreased by allowing the sintering shrinkage in the interstices between Si particles to proceed thoroughly.

The shaped article, after completion of the sintering shrinkage of Si, is subjected to a nitriding reaction in an atmosphere of nitrogen at a temperature in the range of 1,200° to 1,500° C. The speed of nitriding increases in proportion as the partial pressure of nitrogen increases. A pressure exceeding atmospheric pressure is applied to the reaction system for the purpose of accelerating the permeation of nitrogen into the sintered mass of Si particles and consequently increasing the speed of nitriding. As the sintering shrinkage of Si by the aforementioned treatment proceeds, the paths for infiltration of nitrogen into the interior part of the sintered mass of Si particles are narrowed. The application of a high partial pressure of nitrogen serves to promote the permeation of nitrogen to the interior of the sintered mass of Si, accelerate the nitriding of Si and cut the time for the nitriding reaction.

Another aspect of the present invention utilizes the fact that hydrogen ions and carbon ions, which are released from those compounds capable of producing $H_2$ gas and the gas of hydrocarbons such as $CH_4$ and $C_2H_6$ at a high temperature just after the decomposition of the compounds are in a highly activated state and have an activity for extremely powerful reducing action.

For this purpose, high molcular organic silicon compounds having C and Si as the main skeleton component can suitably be used. These compounds thermally decompose at a temperature higher than 500° C. to evolve $H_2$ gas and the gas of hydrocarbons such as $CH_4$ and $C_2H_6$. The compounds usable in this invention are not limited only to the high molecular organic silicon compounds. Any compound that evolves activated H ions and C ions having the function of reducing the silica film near 1100° C. can be used as required. However, the use of a compound that thermally decomposes already at a temperature lower than 500° C. to evolve such gases, for example, polyvinylbutyral, is not desired, since the compound itself reacts to lose its reducing nature before reaching the reaction temperature range of about 1100° C., and therefore it becomes difficult to maintain the reducing atmosphere at the reducing temperature for silica.

The process of this aspect of the invention for producing silicon nitride sintered products comprises the following steps:

(A) Preparing a molded body by molding a powder mixture prepared by adding to powdery silicon grains, a high molecular organic silicon compound having C and Si as the main skeleton component that decomposes under heating to produce $H_2$ or hydrocarbon compounds such as $CH_4$ and $C_2H_6$ over a temperature region from 500° C. and 1200° C.; (B) subjecting said molded body to heat treatment to remove silicon oxide film in a gas atmosphere of nitriding gas and/or an inert gas; and (C) thereafter chemically converting silicon into silicon nitride in a nitriding gas atmosphere at a temperature higher than 1200° C.

An essential element of this aspect of the present invention is to use in the process an additive which produces a reducing atmosphere. This reducing atmosphere keeps the sintering compact inactive so that the silica film coated on the silicon powder surface may be removed at a temperature of nearly 1100° C., which is the most suitable temperature range to control the sintering of silicon particles. The additive used to satisfy this requirement is a high molecular organic silicon compound having C and Si as the main skeleton component (PSC) which decomposes to produce $H_2$ or hydrocarbon compounds such as $CH_4$ and $C_2H_6$ over a temperature of about 500° C.

Sintering shrinkage of about 6% can be attained in the sintered product by dispersing to incorporate the compound evolving heat decomposed gases at a temperature from 500° C. to 1100° C. in the vicinity of powdery silicon particles in the starting molded body, applying heat treatment in an inert gas and, thereafter, maintaining the same at 1100° C. for a predetermined time, i.e. 20 hours.

The gase usable for the heat treatment at the first step can include those nitriding gases such as $N_2$, gas mixtures of $N_2$ and $H_2$ and $NH_3$, or those inert gases such as Ar and He. However, the use of the inert gas at a temperature higher than 1200° C. is not desired, since the molded body rapidly causes a significant sintering shrinkage at a temperature in excess of 1200° C., making it difficult to keep open pores in the molded body required for the nitriding reaction to take place. On the other hand, since the reaction proceeds between Si and $N_2$ in the nitriding gas at a temperature in excess of 1200° C., the sintering shrinkage between Si grains is rapidly reduced, and is completely eliminated at 1300° C.

According to this invention, the amount of the sintering shrinkage in the molded body is controlled by utilizing the properties of these gases.

EXAMPLES

The present invention will now be described more specifically below with reference to working examples.

Example A

A solution of polycarbosilane in hexane and Si particles having a particle size adjusted in advance to below 44 μm are mixed by stirring and, at the same time, evaporated to expel the hexane. A mixed powder consisting of 90% by weight of the Si particles so obtained and 10% by weight of an organic high molecular silicon compound is molded to produce a test specimen measuring 50 mm × 30 mm × 10 mm.

This test specimen is held in an atmosphere or argon gas at 1,100° C. for 20 hours and then subjected to thermal synthesis in an atmosphere of nitrogen gas at a pressure of 4 kg/cm$^2$ and a temperature eventually elevated to 1,500° C., to afford a sintered body of silicon nitride. This sintered body exhibited highly desirable results of 6.3% shrinkage, 2.92 g/cm$^3$ density, and 63 kg/mm$^2$ bending strength.

Example B

A solution of phenol resin in alcohol and Si particles having a particle size adjusted in advance to below 44 μm is mixed by stirring and, at the same time, evaporated to expel the alcohol. A mixed powder consisting of 90% by weight of the Si particles so obtained and 10% by weight of phenol resin is molded to produce a test specimen measuring 50 mm × 30 mm × 10 mm.

This test specimen is subjected to a nitriding reaction under the same conditions as in Example A. The sintered body consequently obtained exhibited highly desirable results of 6.8% shrinkage, 2.90 g/cm$^3$ density, and 65 kg/mm$^2$ bending strength.

Comparative Experiment A

A test specimen indentical in shape with the test specimen of Example A is produced by following the procedure of Example A, except that the ratio of polycarbosilane is changed to 3% by weight. This test specimen is subjected to a nitriding reaction under the same conditions as in Example A. The sintered body consequently obtained exhibited only unsatisfactory results of 0.8% shrinkage, 2.35 g/cm$^3$ density, and 13 kg/mm$^2$ bending strength.

Comparative Experiment B

A test specimen identical in shape with the test specimen of Example A is produced by following the procedure of Example A, except that the ratio of polycarbosilane is changed to 20% by weight. When this test specimen is subjected to a nitriding reaction under the same conditions as in Example A, the nitriding obtained proved to be defective and a large amount of Si particles remained in an unaltered form.

Comparative Experiment C

The test specimen of Example A is subjected to a nitriding reaction under the same conditions as in Example A, except that the pressure of the nitrogen gas is kept at atmospheric pressure. In the sintered body consequently produced, an unaltered part resulted from insufficient nitriding.

Comparative Experiment D

A nitriding reaction is carried out by following the procedure of Example A, except that an alcohol solution of polyvinylbutyral (P.V.B.), a substance capable of producing virtually no residual C, is used in place of the resin capable of richly producing residual SiC or C. The sintered body consequently produced exhibited only unsatisfactory results of 0.1% shrinkage, 2.38 g/cm$^3$ density, and 7 kg/mm$^2$ bending strength.

It is clear by comparison of the above working examples and comparative experiments that the present invention is notably effective in allowing a sintered body to acquire sufficiently high sintering shrinkage and high density and acquire outstanding mechanical properties.

The effect of using an organic silicon polymer (hereinafter referred to as P.C.S.) as a compound for evolving $H_2$ gas and the gas of hydrocarbons such as $CH_4$ and $C_2H_6$ at a temperature from 500° C. to 1100° C. in the sintering of the powdery silicon grains will now be described through examples.

Example 1

A hexane solution which contains, dissolved therein, P.C.S. comprising C and Si as the main skeleton ingredient is admixed into powdery silicon particles of less than 44 μ in particle size, at a mixing ratio of 90% by weight of the powdery silicon particles and 10% by weight of the P.C.S. Then, after evaporating hexane under mixing and agitation, a molded body is prepared from the thus obtained powder.

The molded body is nitrided under the conditions of heat treatment up to 1300° C. shown in Table 1 below. The results are shown in the Table.

As a comparative example, sintering is also carried out by using an alcoholic solution of polyvinylbutyral (P.V.B.) instead of P.C.S. under the same conditions as above. The addition amount of P.V.B. is further decreased to 5% by weight in one of the cases. The results of the comparative examples are also shown in Table 1.

Heat decomposing property of P.C.S. under non-oxidative atmosphere was such that it evolved hydrogen and methane series gases by about 15% in a range between 250° C. – 500° C. and by about 30% in a range between 500° C. – 1200° C. On the other hand, polyvinylbutyral was completely decomposed up to 500° C.

Example 2

A solution of phenol resin (P.H.R) dissolved in alchohol was admixed into powdery silicon particles of less than 44 $\mu$ in particle size at a mixing ratio of 90% by weight of powdery silicon particles and 10% by weight of phenol resin and, after evaporating alcohol under mixing and stirring, a molded body was prepared in the conventional manner by using the thus obtained powder and nitrided under the conditions shown in Table 2. The results are also shown in the table. The heat decomposing property of the phenol resin under a non-oxidative atmosphere was such that it started to evolve gases from about 450° C. and completes the gas evolution about at 1200°C., in which the amount of hydrogen and methane series gases evolved within this range was about 50%. In the same manner, experiment was also carried out for the specimens prepared from P.C.S and P.V.B as described in Example 1 under the same conditions. The addition amount of P.C.S and P.V.B was 10% by weight for each of the cases.

TABLE 1

| No. | Type of additive (wt %) | Type of gas | Heat treatment condition: up to 1300° C. | Shrinkage in nitridation (%) | Quality $\rho s$ | $\delta f$ |
|---|---|---|---|---|---|---|
| 1 | P.C.S (10%) | Ar | temperature rise 40° C./Hr, 1100° C. × 20 Hr kept, thereafter temperature increased, switched to $N_2$ gas | 6.3 | 2.92 | 63 |
| Comparative Example | P.V.B (10%) | | | 0.09 | 2.33 | 6.8 |
| 2 | P.C.S (10%) | Ar | temperature rise 40° C./Hr, 1100° C. × 20 Hr kept, thereafter temperature increased, switched to $N_2$ gas | 6.3 | 2.92 | 63 |
| Comparative Example | P.V.B (5%) | | | 0.12 | 2.41 | 9.1 |
| 3 | P.C.S (10%) | $N_2$ | temperature rise 40° C./Hr, 1200° C. × 20 Hr kept, 1300° C. × 30 Hr kept | 5.9 | 2.88 | 64 |
| Comparative Example | P.V.B (10%) | | | 0.10 | 2.38 | 6.9 |
| 4 | P.C.S (10%) | 90:$N_2$ + 10:$H_2$ | temperature rise 40° C./Hr, 1200° C. × 20 Hr kept, 1300° C. × 30 Hr kept | 6.1 | 2.90 | 62 |
| Comparative Example | P.V.B (10%) | | | 0.13 | 2.42 | 9.3 |
| 5 | P.C.S (10%) | 50:$N_2$ + 50:Ar | temperature rise 40° C./Hr, 1200° C. × 20 Hr kept, thereafter switched to only $N_2$ gas | 6.4 | 2.96 | 61 |
| Comparative Example | P.V.B (10%) | | | 0.16 | 2.48 | 10 |
| 6 | P.C.S (10%) | 45:$N_2$ + 45:Ar + 10:$H_2$ | temperature rise 40° C./Hr, 1200° C. × 20 Hr kept, thereafter switched to only $N_2$ gas | 6.5 | 2.97 | 62 |
| Comparative Example | P.V.B (10%) | | | 0.16 | 2.48 | 10.3 |

(unit kg/mm²)

Note:
$\rho s$: Bulk density of sintered product
$\delta f$: Bending strength of sintered product at 1400° C.
P.C.S: Organic silicon polymer
P.V.B: Polyvinylbutyral

TABLE 2

| No. | Type of additive | Type of gas | Heat treatment condition: up to 1300° C. | Shrinkage in nitridation (%) | Quality $\rho s$ | $\delta f$ |
|---|---|---|---|---|---|---|
| 1 | P.H.R | 90:Ar + 10:$H_2$ | temperature rise 40° C./Hr, 1100° C. × 20 Hr kept, thereafter switched to $N_2$ gas | 6.8 | 2.90 | 65 |
| 2 | P.H.R | 90:He + 10:$H_2$ | temperature rise 40° C./Hr, 1100° C. × 20 Hr kept, thereafter switched to $N_2$ gas | 6.8 | 2.90 | 65 |
| 3 | P.H.R | 45:Ar + 45:He + 10:$H_2$ | temperature rise 40° C./Hr, 1100° C. × 20 Hr kept, thereafter switched to $N_2$ gas | 6.8 | 2.90 | 65 |
| 4 | P.H.R | 90:He + 10:$H_2$ | temperature rise 40° C./Hr, 1350° C. × 10 Hr kept, thereafter switched to only $N_2$ gas | 7.9 | 2.49 | 13 |
| 5 | P.H.R | 50:He + 50:$N_2$ | temperature rise 40° C./Hr, 1200° C. × 20 Hr kept, thereafter switched to only $N_2$ gas | 6.6 | 2.89 | 62 |
| 6 | P.H.R | 90:He + | temperature rise 40° C./Hr, | 7.1 | 2.94 | 63 |

TABLE 2-continued

| No. | Type of additive | Type of gas | Heat treatment condition: up to 1300° C. | Shrinkage in nitridation (%) | Quality ρs | δf |
|---|---|---|---|---|---|---|
| | P.C.S P.V.B | 10:H$_2$ | 1150° C. × 20 Hr kept, thereafter switched to N$_2$ gas | 7.0 0.18 | 2.95 2.49 | 61 10.3 |
| | | | | (unit kg/mm$^2$) | | |

Note:
ρs: Bulk density of sintered product
δf: Bending strength of sintered product
P.H.R: Phenol resin As shown in Example 1, evolving reducing gases, that is, H$_2$ and CH$_4$ gas, within a range between 500° C. - 1200° C. is extremely high.

The heat shrinkage rate in the conventional molded body is about 0.1% under the same temperature condition and, accordingly, the effect obtained by this invention is much more significant as compared with the conventional method.

The silicon nitride sintered product obtained according to this invention has, as physical properties, bulk density of 2.92, bending strength at an atmospheric temperature of 60 kg/mm$^2$ and bending strength at 1400° C. of 63 kg/mm$^2$. These performances of the product are at such a high level as could not be attained by the conventional reaction sintering method and the great strength at 1400° C. is the highest among the quality of ceramics presently known.

The hot strength components obtained by the novel reaction sintering method according to this invention have a prominent feature expectation and they can be reestimated in such application uses as engines, turbines and blades made of ceramics that have presently been considered difficult.

A sintered body of silicon nitride obtaiend by the method of this invention possesses high density and high strength not attainable by the conventional reaction sintering method and, therefore, finds utility particularly as a high-temperature structural material in applications which the conventional reaction sintered body has failed to meet.

U.S. Ser. No. 762,609 filed Aug. 5, 1985 now abandoned, and U.S. Ser. No. 942,243 filed Dec. 16, 1986 now abandoned, are incorporated herein by reference.

What we claim is:

1. A method for producing a silicon nitride sintered product comprising preparing a molded body by adding, to powdery silicon grains, a high molecular organic silicon compound having C and Si as a main skeleton component that decomposes under heating to produce H$_2$ or hydrocarbon compounds such as CH$_4$ and C$_2$H$_6$ at a temperature from greater than 500° C. to 1200° C., subjecting said molded body to a heat treatment in a gas atmosphere selected from the group consisting of a nitriding gas, an inert gas and mixtures thereof, and then chemically converting silicon to silicon nitride in a nitriding gas at a temperature above 1200° C.

2. A method for producing a silicon nitride sintered product comprising preparing a molded body by molding a powder mixture prepared by adding, to powdery silicon grains, a high molecular organic silicon compound having C and Si as the main skeleton component that decomposes under heating to produce H$_2$ or hydrocarbon compounds such as CH$_4$ and C$_2$H$_6$ at a temperature from greater than 500° C. to 1200° C.; subjecting said molded body to heat treatment to remove silicon oxide film in a gas atmosphere selected from the group consisting of nitriding gas, inert gas and mixtures thereof; and then chemically converting silicon into silicon nitride in a nitriding gas atmosphere at a temperature above 1200° C.

3. A method for producing a silicon nitride sintered product comprising preparing a molded body by molding a powder mixture prepared by adding to silicon powder, a high molecular organic silicon compound having a resinous state at room temperature and consisting of C and Si and a main skeleton component that decomposes under heating to produce H$_2$ or hydrocarbon compounds such as CH$_4$ and C$_2$H$_6$ at a temperature from greater than 500° C. to 1200° C.; subjecting said molded body to heat treatment to remove silicon oxide film in a gas atmosphere selected from the group consisting of nitriding gas, inert gas and mixtures thereof; and then chemically converting silicon into silicon nitride in a nitriding gas atmosphere at a temperature above 1200° C.

4. A method as in claim 3, wherein said heat treatment comprises heating at about 1100° C. for about 20 hours.

5. A method as in claim 3, wherein said inert gas is selected from the group consisting of Ar and He.

6. A method as in claim 3, wherein said nitriding gas atmosphere consists of nitrogen.

7. A method as in claim 3, wherein said heat treatment gas atmosphere nitriding gas is selected from the group consisting of N$_2$ and mixtures of N$_2$, H$_2$ and NH$_3$.

8. A method as in claim 3, wherein said heat treatment comprises heating said molded body incrementally to about 1100° C. and then maintaining said molded body at about 1100° C. for about 20 hours.

9. A method as in claim 8, wherein said incremental heating to about 1100° C. comprises increasing the temperature about 40° C. per hour.

10. A method as in claim 3, wherein said heat treatment comprises heating at a temperature between about 500° C. and 1200° C.

* * * * *